United States Patent [19]

McGirt

[11] Patent Number: 5,294,026
[45] Date of Patent: Mar. 15, 1994

[54] VEHICLE SUNDRIES ORGANIZER
[76] Inventor: Bobby D. McGirt, 801 Crawford St., Wilson, N.C. 27893
[21] Appl. No.: 20,847
[22] Filed: Feb. 19, 1993
[51] Int. Cl.[5] .............................................. B60R 7/04
[52] U.S. Cl. ............................. 224/42.43; 224/42.46 R
[58] Field of Search ............... 224/275, 42.43, 42.46 B, 224/42.44, 42.45 R, 42.46 R

[56] References Cited
U.S. PATENT DOCUMENTS

| | | | |
|---|---|---|---|
| 1,383,324 | 7/1921 | Martell | 224/42.44 X |
| 2,645,392 | 7/1953 | Gottsegen et al. | 224/275 X |
| 3,951,486 | 4/1976 | Tracy | 224/42.46 B X |
| 4,928,865 | 5/1990 | Lorence et al. | 224/275 |

FOREIGN PATENT DOCUMENTS 2029346  3/1980  United Kingdom ............... 224/275

Primary Examiner—Renee S. Luebke
Attorney, Agent, or Firm—John G. Mills & Associates

[57] ABSTRACT

This invention is a vehicle sundries organizer and includes a base portion, a hinged lid portion and a pair of pivoted, length adjustable support arms. Also a fold out cup holder having a plurality of cup receiving openings is provided. Further a sundries organizing compartment is provided in the base portion and a vanity mirror with illuminating lights is provided on the interior of the lid portion.

5 Claims, 2 Drawing Sheets

VEHICLE SUNDRIES ORGANIZER

FIELD OF INVENTION

This relates to organizing means and more particularly to folding, tray-like means for use in vehicles.

BACKGROUND OF INVENTION

Whenever people travel there invariably arises a need to support various articles either immediately in front of or beside the traveler.

Trays that fold out from the back of airline seats are, of course, well known to the traveling public. These fold out trays can be used for holding books, brief cases and the like as well as food serving trays during meal and snack times. These trays, however, usually are generally flat and any sudden centrifugal forces encountered can send the articles resting on the tray flying. Also the trays built into the back of passenger seats in motor vehicles have been provided.

Portable vehicle office organizers have also been developed and they usually sit on the seat by the passenger or passengers and can be secured thereto against being dislodged due to the motion of the vehicle. These organizers are difficult to use since the person must have them mounted on either one side or the other and he or she must turn to use the same.

BRIEF DESCRIPTION OF INVENTION

After much research and study into the above mentioned problems, the present invention has been developed to provide a vehicle sundries organizer which can be adjustably disposed in front of the user at a convenient height. When not in use or being transported, the present invention folds to a compact, case-like configuration.

When it is desired to use the sundries organizer of the present invention, the support arms are pivoted from their folded position to their use position. The length of the arms are then adjusted to the correct height which can be either horizontal or on an incline. The lid of the organizer is then opened to expose both the sundries organizer compartment and the interior of the lid which includes battery powered lights on either side of a vanity mirror. Also a fold out cup holder is provided for multiple cups.

Once the user of the present invention has either reached his or her destination or no longer needs the present invention, the cup holder is pivoted from the exterior to the interior of the base portion. The lid portion is closed, the support arms are retracted and then pivoted to the storage position adjacent the bottom of such base portion and the now compact organizer can either be stored under the seat, behind the seat, or in any other convenient location or can readily be transported by grasping the handle which is conveniently provided.

DISCUSSION OF PRIOR ART

The following references represent the closest prior art of which the inventor is aware and is intended to meet the requirements of 35 CFR 1.98 for Information Disclosure Statements:

List of References:
U.S. Pat. No. 4,519,648 Issue Date: May 28, 1985 Inventor: Nanad Jovanovic Assignee: Bayerische Motoren Works AG, Fed. Rep. of Germany U.S. Pat. No. 4,832,241 Issue Date: May 23, 1989 Inventor: Denise E. Radcliffe Concise Explanation of References U.S. Pat. No. 4,519,648 to Nanad Jovanovic discloses an arrangement for the pivotal mounting of a tray to the seat back of a seat of a passenger motor vehicle and includes a means for adjusting the incline of the tray or table top when it has been pivoted into a substantially horizontal, in use position.

U.S. Pat. No. 4,832,241 to Denise E. Radcliff discloses a vehicle portable-office organizer designed to be detachedly mounted to the passenger seat of the vehicle and includes a tray with dividers, a cradle on the front thereof and a cover that also serves as a writing table. This organizer is mounted to the side of the user which is, at best, awkward and difficult to use.

OBJECTS OF INVENTION

In view of the above, it is an object of the present invention to provide a vehicle sundries organizer that is compact to transport and store and yet has multiple use features when in deployed, use configuration. Another object of the present invention is to provide a vehicle sundries organizer that includes an organizing compartment, a fold out cup holder, and a pivoted lid with a built in illuminated vanity. Another object of the present invention is to provide a vehicle sundries organizer with length adjustable support arms. Another object of the present invention is to provide a vehicle sundries organizer with support arms that engage the slot between the window and the interior portion of the vehicle. Another object of the present invention is to provide a sundries organizer with a bottom sundries compartment including a fold out, multiple cup holder. Another object of the present invention is to provide in a vehicle sundries organizer, an illuminated vanity in a pivoted lid portion. Other objects and advantages of the present invention will become apparent and obvious from a study of the following description and accompanying drawings which are merely illustrative of such invention.

DETAILED DESCRIPTION OF INVENTION

Figure 1:
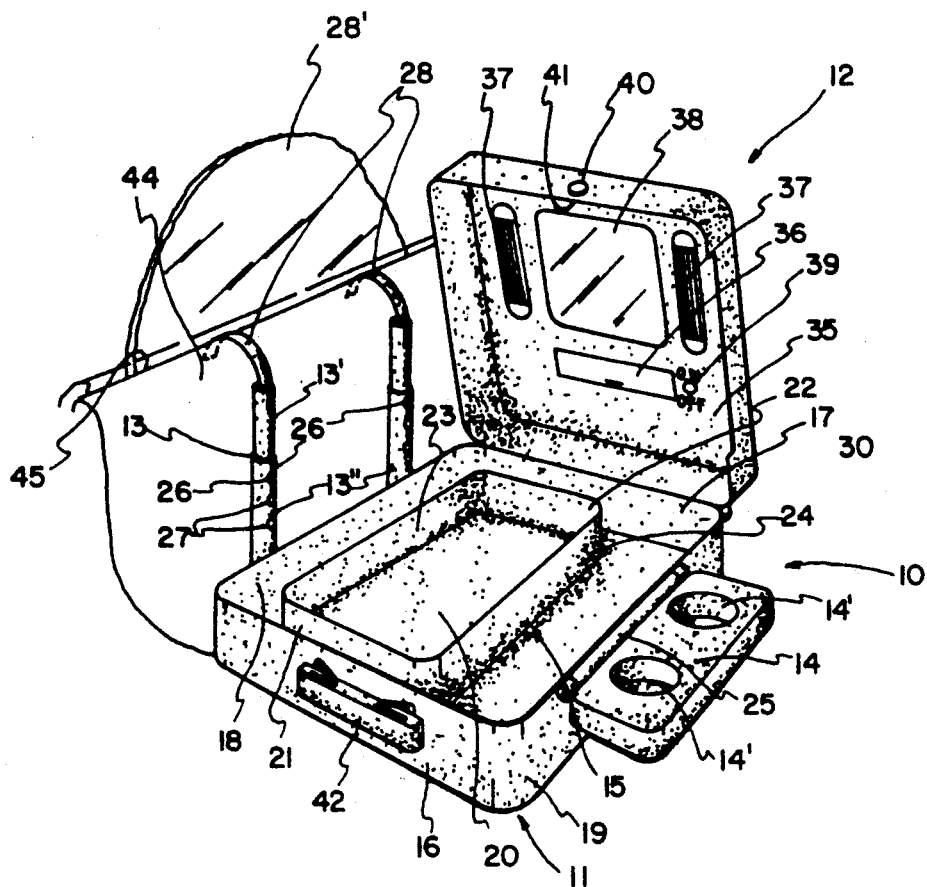
FIG. 1 is a perspective view of the vehicle sundries organizer of the present invention mounted on the interior of a vehicle with the lid open and the multi-cup holder deployed.

With further reference to the drawings, the vehicle sundries organizer of the present invention, indicated generally at 10, includes a base portion, indicated generally at 11 and a lid portion, indicated generally at 12.

The base portion 11 includes a front wall 16, a rear wall 17 and side walls 18 and 19, all disposed about the periphery of bottom 20.

Sundries organizing compartment 15 is generally rectangular in shape and includes end walls 21 and 22 and side walls 23 and 24. End wall 23 is disposed in space relation to front wall 16, side wall 23 is disposed in space relation to side wall 18, end wall 22 is disposed in space relation to rear wall 17 and side wall 24 is disposed in space relation to side wall 19.

The first three above enumerated space relations are all approximately the same distance with the space relation between walls 19 and 24 being much greater. This greater space relation leaves room for the fold out, multi-cup holder 14 to be deployed interiorly of the sundries organizer 10 when in the folded or closed position shown in FIGS. 2 and 3.

The cup holder referred to above is pivotively mounted on the upper edge of side wall 19 by means such as hinge connector 25. This hinge mounting of cup holder 14 allows the same to be deployed outwardly of the organizer during use and pivoted inwardly when being transported.

The pair of support arms 13 are length adjustable and preferably telescoping in structure. They are shown extended in FIG. 1 and retracted in FIGS. 2 and 3. Arm portion 13' telescopes into arm portion 13". A locking means such as spring biased locking pin 26 is operatively mounted on each arm portion 13' for engagement with the pin openings 27 of arm portion 13". Since the use of spring biased locking pins for adjusting of the length of telescoping arms are well known to those skilled in the art, further detailed discussion of the same is not deemed necessary.

Support hooks 28 are pivotally mounted on the end of each arm portion 13' opposite its telescopic engagement with arm portion 13". During use, the support hooks 28 are disposed as shown in FIGS. 1 and 2 but when in the stored position, they are pivoted flat against the bottom 20 of base portion 11 as shown in FIG. 3.

The support arms 13 are pivotally mounted to the exterior of the juncture of side wall 18 and bottom 20 by a pair of hinges 29. Since hinges of this type are well known to those skilled in the art, further detailed discussion of the same is not deemed necessary.

Figure 2:
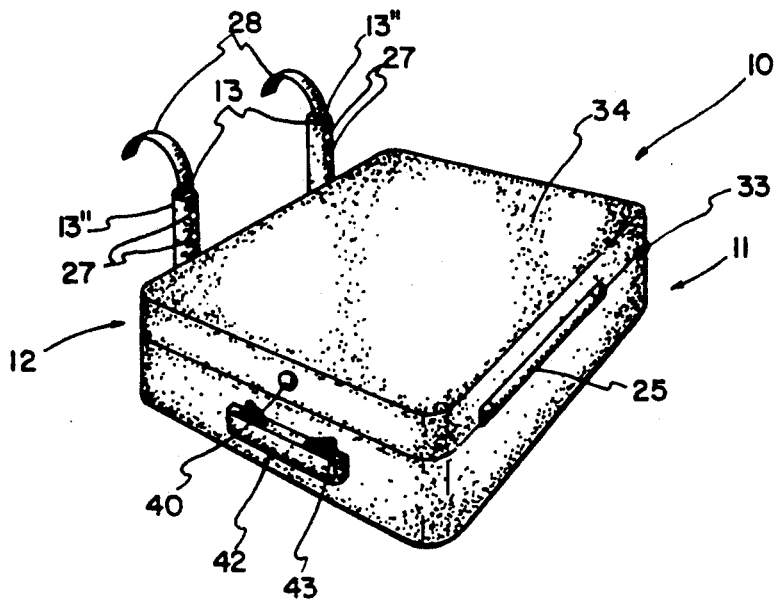
FIG. 2 is a perspective view of the organizer with the cup holder folded inwardly and the lid closed.
Figure 3:
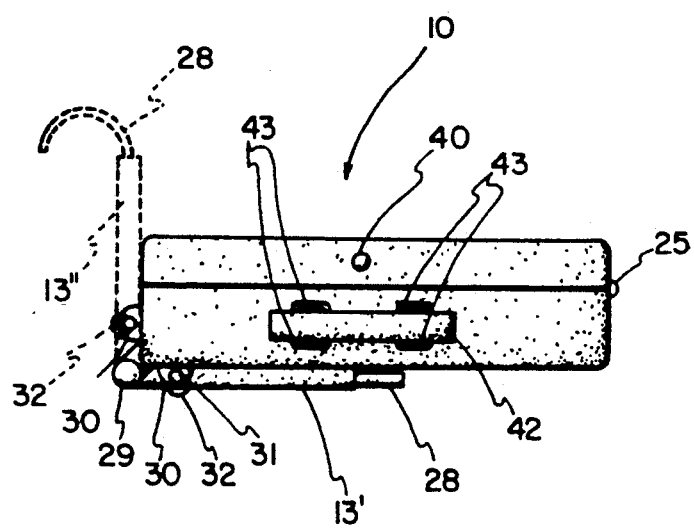
FIG. 3 is a side elevational view of the organizer with the support arms folded in the transport position.

A suitable locking means is provided to secure each of the support arms 13 both in the deployed position as shown in FIG. 1 and in the folded position shown in FIG. 3. One means of locking these arms in the positions indicated is to provide outwardly projecting tabs 30 on the exterior of wall 18 and bottom 20 juxtaposed to each of the support arms so that a pin 31 can be inserted through said tab and into said support arm to lock the same in place. A pull ring 32 is provided on the end of pin 30 for easy removal of the same. Since locking pins of this type are well known to those skilled in the art, further detailed discussion of the same is not deemed necessary.

The lid portion 12 is pivotively connected by means of hinge 33 to the upper edge of wall 17. This hinge is of the friction type so that at what ever adjusted angle the lid is opened to it will remain in that position. Since tight, high friction hinges are well known to those skilled in the art, further detailed discussion of this portion of the present invention is not deemed necessary.

The exterior 34 of the lid portion 12 is generally flat as seen in FIG. 2 and can be used as a writing desk, tray holder or the like as clearly seen in FIG. 2. The interior 35 of lid portion 12 includes a battery compartment 36 which is operatively connected to vanity lights 37 on opposite sides of vanity mirror 38. A switch 39 is provided to allow the vanity lights 37 to be turned "on" and "off". Since battery compartments, vanity lights and the control switch interposed therebetween are well known to those skilled in the art, further detailed discussion of the same is not deemed necessary.

A means for locking the vehicle sundries organizer 10 in the closed position shown in FIGS. 2 and 3 can be provided, such as spring loaded button 40 which operates locking clasp 41. Also other means for locking the lid and base portion together can be provided such as the hasps and latches used on suitcases and other closable means. Since these types of locking means are well known to those skilled in the art, further detailed discussion of the same is not deemed necessary.

For convenience in transporting, a collapsible handle 42 is provided on the exterior of front wall 16 with the normal handle connectors mounting the same. Handles of this type are widely used on suitcases, brief cases and the like and further detailed discussion of the same is not deemed necessary.

When the vehicle sundries organizer of the present invention is in the closed, collapsed position shown in FIG. 3, the handle 42 can be grasped and it can be easily carried from one place to another.

Once the vehicle or other means where the organizer is to be used has been reached, pull ring 32 can be manipulated to remove the pin 31 from the locking tab 30 on bottom 20 and the support arm 13 disposed adjacent thereto. The arm 13 is then pivoted 270° to the position shown in dotted lines in FIG. 3 and the pin inserted through tab 30 on the side of the organizer to once again lock the arm in place.

The spring biased locking pins 26 are then manipulated into the desired locking pin openings 27 for the correct height adjustment of the support hooks 28. These hooks are then pivoted 90° to the position shown in FIGS. 1 and 2. The hooks are now ready to be slid down between the window 28' and the interior wall 44 to secure the sundries organizer of the present invention in position.

The locking button 40 can then be pressed to disengage locking hasp 41 in the lid portion from the base portion 11 to allow said lid to pivot on hinge 33 from closed to open position. Since hinge 33 is a friction hinge, infinite adjustments can be made as to the position of the lid relative to the base.

The cup holder 14 can also be pivoted outwardly to the position shown in FIG. 1 so that cups or other containers can be held in place without danger of sliding off and spilling. It should be noted that the cup holder 41 can also be used when it is still disposed inside of the base portion 16. In other words it does not have to be pivoted outwardly to be used since the cup openings 14' go all the way through the holder.

Books, toys, food, and any other desired items can be placed both within the sundries organizing compartment 15 and between such compartment and the front, rear, and side walls of the base portion 11 in an organized fashion.

Should there be a desire to use the vanity mirror 38 in low light conditions, the switch 39 can be turned "on" to illuminate vanity lights 37. This will also illuminate the open base portion 11 and the various sundries placed therein. Such lights 37 can even be used for illuminating reading material that is placed on or in the base portion of the organizer.

Whenever the lights 37 begin to dim, the battery compartment 36 can be opened and new batteries placed therein in the normal manner of battery powered lights.

Whenever it is desired to remove the sundries organizer of the present invention from its use position, the lights 13 can be cut "off" by manipulating switch 39. The cup holder 14 is then pivoted into the interior of the base portion 11 and the lid 12 closed. The hasp 41 in lid 12 will engage the base portion 11 to maintain the closed position. The organizer is then lifted to disengage the support hooks 28 from the slot 45 between the window 28' and the interior wall 44. Pull rings 32 can then be grasped to remove pins 31 from the tabs 30 on the exterior of side wall 18. The arms 13 can then be pivoted to the position shown in solid lines in FIG. 3 and the locking pins 30 reinserted through tab 30 on the bottom 20 of the base portion and into arm 13. The support hooks 28 are pivoted 90° to lie juxtaposed to the exterior of bottom 20, again as shown in solid lines in FIG. 3. The handle 42 can now be grasped and the vehicle sundries organizer of the present invention moved, stored or otherwise placed until it is again mounted as earlier described.

From the above it can be seen that the present invention provides a simple, relatively inexpensive and yet highly efficient means of supporting and organizing various sundries, particularly during travel in a vehicle. It can also be readily closed for compact transport or storage.

The terms "top", "bottom", "sides", "front", "rear" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A vehicle sundry organizer comprising: a base portion having an open top with front, rear, and side walls disposed about the periphery of a bottom; a lid portion hingedly mounted by at least one friction type hinge on one of said walls for covering said open top; at least two support arms
   pivotally mounted at one end to said base portion so that said arms can lie flat against said bottom during transport and can be pivoted to lie flat against one of said side walls when in use, the other end of said support arms terminating in a support hook; a cup holder hingedly mounted on one of said walls so that it can be pivotally disposed and used alternately interiorly of said base portion and exteriorly thereof; a vanity mirror mounted on the inside of said lid portion; and at least one illumination means operatively associated with said vanity mirror whereby said organizer can be transported in closed position and can be mounted on the interior of a vehicle through use of said support hooks and opened to give access to the interior thereof where the vanity mirror and the cup holder are provided.

2. The organizer of claim 1 wherein said support arms are extensible and retractable.

3. The organizer of claim 2 wherein said support arms are telescopic in structure.

4. The organizer of claim 1 wherein a sundries organizing compartment is provided inside said base portion.

5. The organizer of claim 4 wherein said sundries organizing compartment is composed of end walls and side walls mounted on said bottom and in spaced relation to the front, rear and side walls disposed about the periphery of said bottom.

* * * * *